No. 677,873. Patented July 9, 1901.
P. LUHR.
ELECTRIC ARC LAMP.
(Application filed Aug. 15, 1900.)
(No Model.) 2 Sheets—Sheet 1.
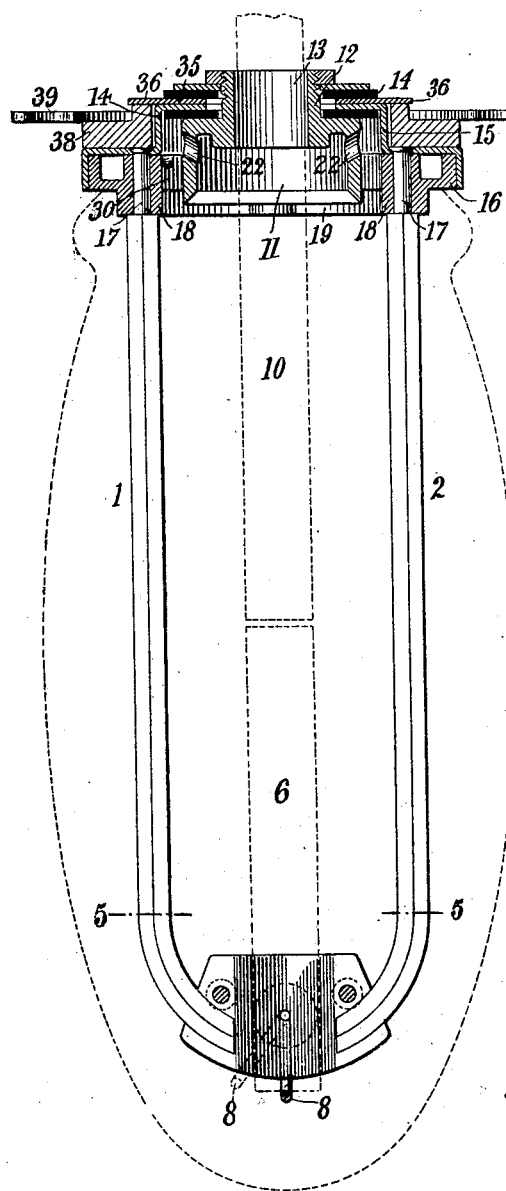
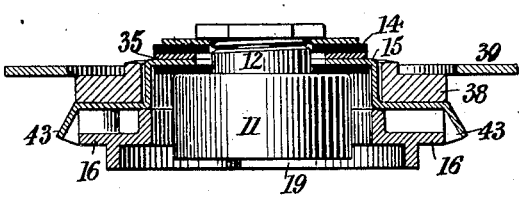
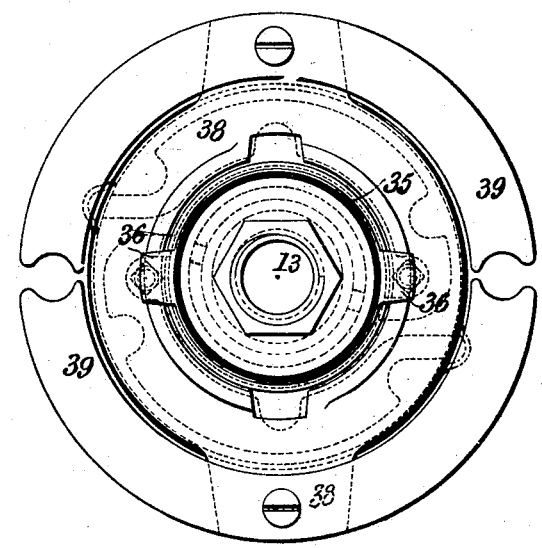
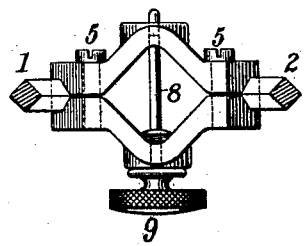
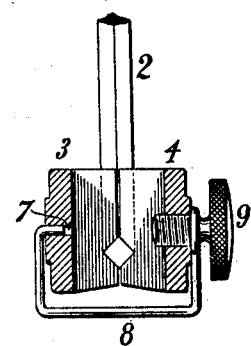
Witnesses: Raphaël Netter, George H. Stockange
Philip Luhr Inventor
by Charles A. Terry. Atty No. 677,873. Patented July 9, 1901.
P. LUHR.
ELECTRIC ARC LAMP.
(Application filed Aug. 15, 1900.)

(No Model.) 2 Sheets—Sheet 2.

Witnesses:
Raphaël Netter
George H. Stockage

Philip Luhr, Inventor
by Alexander A. Neary, Att'y

UNITED STATES PATENT OFFICE.

PHILIP LUHR, OF ORANGE, NEW JERSEY, ASSIGNOR TO MANHATTAN GENERAL CONSTRUCTION COMPANY, OF NEW YORK.

ELECTRIC-ARC LAMP.

SPECIFICATION forming part of Letters Patent No. 677,873, dated July 9, 1901.

Application filed August 15, 1900. Serial No. 26,936. (No model.)

*To all whom it may concern:*

Be it known that I, PHILIP LUHR, a citizen of the United States, and a resident of Orange, in the county of Essex and State of New Jersey, have invented certain new and useful Improvements in Gas-Checks, of which the following is a specification.

My invention relates to improvements in gas-checks, whereby the gases inside the globe of an inclosed arc-lamp are thoroughly intermingled with the external air in the passages of the gas-check or in the chambers thereof.

The object is to create a circulation of the air and the gases such that any tendency to the formation of an arc between the upper carbon and the lamp-frame will be corrected by the movements of the gases and the air, special regard being had to the matter of localizing the heat inside the lamp-globe near the outlet-passages for the gases of combustion in order to produce the circulation desired. At the same time too free an exit for the gases and too free an inlet for the external air are provided against by choking or clogging the passages of the gas-check through the medium of suitable lugs or projections. Nevertheless the space for the exit of the inclosed gases is such as to give opportunity for the expulsion of such gases through the gas-check in case of an explosion of any sort inside the globe.

In one form of gas-check referred to the air is admitted upon opposite sides and circulates in a given direction through semicircular gas ducts or channels in the two halves of the gas-check, encountering the gas and being also obstructed by projecting lugs, so that the air and the gas are thoroughly mixed. In another form of my gas-check the entrance for the gases is on one side and the entrance for the air is on the opposite side, the circulation being in opposite directions in the two halves. In a third form of my gas-check the passage for the air and the gases is continuous, with the exception that lugs are provided for preventing too free a circulation, these lugs forming virtually four separate chambers.

The invention is illustrated in the accompanying drawings, in which—

Figure 7:
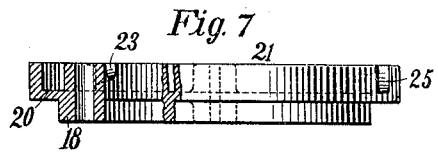
Figure 8:
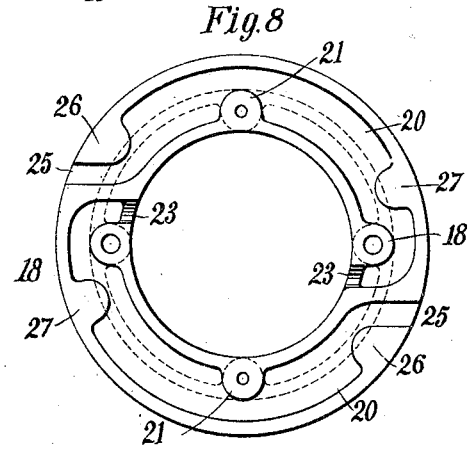
Figure 9:
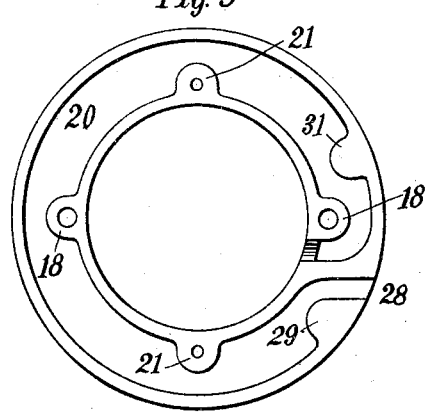
Figure 10:
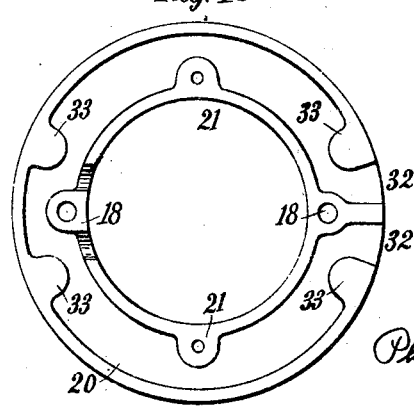

Figure 1 is an elevation of an inclosed arc-lamp embodying my invention, the upper portion thereof, including the gas-check, being shown in section and the carbons being shown in dotted lines. Fig. 2 is a vertical section through the upper portion of the lower lamp structure, showing the central chamber thereof in full lines. Fig. 3 is a plan of the lower lamp structure. Fig. 4 is a vertical section through the central portion of the support for the gas-check and its connected parts. Fig. 5 is a plan of the holder for the lower carbon, showing the side rods in section along the line 5 5 in Fig. 1. Fig. 6 is a vertical section through the lower-carbon holder. Fig. 7 is a vertical section through the gas-check, showing the air and gas-passages therethrough. Fig. 8 is a plan of the first form of gas-check described above. Fig. 9 is a similar view of the second form, and Fig. 10 is a similar view of the third form.

Referring to the drawings in detail, 1 and 2 are the side rods of an inclosed arc-lamp, the same being designed in the form illustrated to be located within the inclosing globe. These side rods are curved toward each other at the bottom, and on opposite sides at their lower ends are secured bent plates or clamps 3 and 4 by means of screws 5 5. The plates 3 and 4 are bent away from each other at the center far enough to receive the lower carbon 6. The plate 3 is provided with an opening 7 to receive one end of a stirrup 8, the other end of which is pivotally secured to the shaft of a thumb-screw 9, which enters the plate 4. The stirrup 8 may be merely a wire, one end of which is bent around the shaft of the screw 9, the structure being such that when the thumb-screw is made tight by turning to the right in the usual way it will hold the stirrup in any position to which it may have been turned. On relieving the pressure of the screw 9 the stirrup may be adjusted to any desired position and afterward firmly held in place by turning the screw again to the right.

In practice in order to insert the lower carbon in place the thumb-screw 9 will be loosened, the stirrup 8 will be turned aside, as indicated in dotted lines in Fig. 1, and the carbon inserted from below. Afterward the stirrup 8 will be turned down into its lowermost position, as indicated in full lines in Fig. 1, and the thumb-screw tightened. In this way the lower carbon will easily be held in place. If the thumb-screw be turned far enough, it will serve the double purpose of holding the stirrup as described and of maintaining the lower carbon firmly in position.

In manufacturing the lower lamp structure it is simply necessary to take a single rod, preferably of soft steel, and bend it into curved shape at the bottom, afterward cutting out a small piece and clamping the lower-carbon holder to the severed ends, being careful to so adjust the holder that the opening in the same shall be midway between the vertical portions 1 and 2 of the severed rod.

Referring now to the upper part of the lamp structure, it will be seen that the upper carbon 10 passes through a cylindrical chamber 11, the hub 12 of which is provided with an opening 13, through which the upper carbon passes, the construction being such that very little gas can escape at the feed-opening between the outer surface of the carbon 10 and the inner wall of the opening 13. The chamber 11 is made in one piece with the hub 12 or is secured thereto by any suitable means, as by a screw connection, and is wide enough to constitute a considerable receptacle for the heated gases rising from the arc. The inner edge of the chamber 11 is beveled or chamfered, as shown, so as to present a rather sharp edge along its lower outer wall, the object of which construction is to assist in breaking up any possible arcing across from the upper carbon to the side rods. The chamber 11, together with its hub 12, is insulated from the rest of the structure at the top of the lamp, as shown at 14 14. Above the chamber 11, but insulated therefrom, is a cap 15, which extends downward and outward and is formed at its edge into a flange, within which is placed the gas-check proper. (Shown at 16.) At two opposite points in the edge or rim of the cap 15 I form ears 43 43, which are so placed as to dam off the outlet-passages in the gas-check and divert the path of the ingoing air toward the highly-heated currents ascending from the walls of the inclosing chamber. The mode in which this action is accomplished will be better understood after the details of the gas-check proper are described. The ears 43 43 also serve to form a hold for twisting the gas-check and the parts connected therewith from a locked position when no side rods are used.

The whole structure is secured to the top of the side rods 1 and 2 by means of screws or rivets 17, which pass from the rods through both the gas-check 16 and the cap 15. To aid in securing a firm connection between the parts last described, lugs 18 18, extending inside the main body of the lower rim 19 of the gas-check, are provided. These lugs are also extended upward, so as to obstruct to some extent a duct or channel 20 between the upper side of the gas-check 16 and the lower side of the cap 15. By referring to Figs. 8, 9, and 10 it will be seen that other lugs 21, 21, 26, 27, 29, 31, and 33 are located in the channel to retard the normal outflow of the gases or to regulate the ingress and egress thereof.

Between the chamber 11 and the inner wall of the gas-check 16 is an annular chamber 30 of considerable capacity. I provide openings 22 22 through the wall of the chamber 11, so that any gases which may collect inside the said chamber may pass out into the annular chamber and produce a preliminary circulation at that point. Moreover, I provide openings 23 23 at the inner ends of the channels 20 in proximity to the openings 22 22 and also in proximity to the point of connection between the gas-check and the posts 1 and 2. By reason of the described construction and arrangement the circulation due to the passage of gases from the chamber 11 to the annular chamber 30 and out through the channel 20 will be augmented by the circulation due to the heat developed in the rods 1 and 2 in the operation of the lamp.

Referring to Fig. 8, it will be seen that the gas-check there shown is provided with openings 25 25, leading from the outer air into the channels 20 20. The incoming air passes first around the lugs 26 26 at the mouth of the channels and is afterward obstructed, as shown, by the lugs 21 21 and by the lugs 27 27. With an inlet of this sort the air and the gases become well mixed within the channels, while the special arrangement and construction of the annular chamber 30 and the chamber 11, with their various openings, insure a sufficient circulation for further thoroughly mixing the air with the gases before the combined air and gas reach the arc.

In Fig. 9 the air entering at 28 passes around a lug 29 and through a channel 20, obstructed by the lugs 21 21 and 18 18 and also by the lug 31. The action is obvious.

In Fig. 10 the air enters a single channel 20 at openings 32 32 and passes in opposite directions, being obstructed by the lugs 18 18 and 21 21, as before, and also by the lugs 33 33. With this style of gas-check the deposit which usually forms on the lamp-globe is carried to the upper part of the inside structure, where it does not interfere with the useful light-rays. In case of an explosion inside the globe the gases will escape through the channel 20 without breaking the globe. Should there be any tendency to the formation of an arc from the carbon to the metal of the lamp-frame, the circulation of the air and gas in the upper part of the globe will be sufficient to correct it.

In the lamp illustrated the side rods are intended to stand inside the usual glass inclosing globe or bulb. The advantages of this form of gas-check are, however, not confined to a lamp structure in which the side rods are so located. It should be understood, therefore, that I do not limit myself in this regard to the style of lamp illustrated, as I may apply my invention to lamps in which the side rods occupy a position outside the inclosing globe.

Above the cap 15 is a spring-washer 35, having projecting lugs 36 36, by means of which the lower lamp structure may be joined to the lower or trim plate of the upper lamp-frame. Such a trim-plate is represented at 37, and it consists, essentially, of a central portion 38, of cast-iron, and two semicircular springs 39 39, of sheet-steel, which form part of the upper lamp-frame. The described structure causes a considerable massing of metal at this part of the lamp and a concentration of the heat on the top casting, whereby the escape of the heat is lessened and incoming currents of air are brought to a higher temperature.

It is evident that the lugs 36 36 coöperate with the central portion 38 of the trim-plate in such a manner as to form a bayonet-joint therewith. The lugs enter openings 40 40 in the central part 38 and may be turned so as to ride up on semicircular flanges 41 41 at the interior of the central opening in the said plate. A stop 42 is provided for limiting the rotary movement of the lugs.

In the described construction the thermal currents developed in the metallic inside frame operate through convection and through the relation of the inside rods to the outlet-passages to check the center draft through the feed-opening, the result being a slow ingress and egress of the air and gases and the consequent normal rate of consumption and long life of the electrodes irrespective of the position of the arc in the inclosing globe. The carbons burn flat, straight, and evenly, causing the heat of the carbon-vapor to be retained under the end of the upper carbon. In direct-current work the long life of the negative carbon maintains the position of the arc in the center of the bulb with the best illuminating effect.

The gas-check and inside frame may be stationary, the former constituting the center of the lamp. It forms a guide for the upper carbon and prevents the carbons from burning slant where washer-clutches are used. It is detachable through a turn to the left. Gas-checks as are illustrated in Figs. 4 and 5 may be used without the inner rod. The form illustrated in Fig. 3 is designed to be used with the inner rods, and the same is also true, by preference, of the other two forms. The inner chamber or central cup may be made of porcelain or lava. When made of cast-iron, it is electrically insulated and also separated from the other castings by heat-insulating washers of mica.

The invention claimed is—

1. An inclosed arc-lamp, containing a gas-check with one or more passages for air and gases, and provided with means for creating a draft or circulation at the mouth of the said passage or passages.

2. A gas-check for inclosed arc-lamps, having one or more passages for the air and the gases of combustion, the said passage or passages being clogged or obstructed by lugs or projections.

3. A gas-check for inclosed arc-lamps, containing one or more channels or passages for the air and the gases of combustion, and provided with an inner chamber which surrounds the upper carbon so as to leave an annular space or chamber within the gas-check proper, the said inner chamber being provided with openings leading to the annular chamber.

4. A gas-check for inclosed arc-lamps, containing one or more channels or passages for for the air and the gases of combustion, and provided with an inner chamber which surrounds the upper carbon so as to leave an annular space or chamber within the gas-check proper, the said inner chamber being provided with openings leading to the annular chamber, such openings being near the mouth of the gas-check passage or passages.

5. A gas-check for inclosed arc-lamps, containing one or more channels or passages for the air and the gases of combustion, and provided with an inner chamber which surrounds the upper carbon so as to leave an annular space or chamber within the gas-check proper, the said inner chamber being provided with openings leading to the annular chamber, such openings being near the metallic side rods of the lamp.

6. A gas-check for inclosed arc-lamps, containing one or more channels or passages for the air and the gases of combustion, and provided with an inner chamber which surrounds the carbon so as to leave an annular space or chamber within the gas-check proper, the said inner chamber being provided with openings leading to the annular chamber, such openings being near the mouth of the gas-check passage or passages, and also being near the heat-conducting side rods of the lamp.

7. An inclosed arc-lamp having heat-conducting side rods, and a gas-check with one or more passages for the air and the gases of combustion, the mouth of the said passage or passages being located near the side rods.

8. In an inclosed arc-lamp, a lower lamp-frame comprising a gas-check and a holder for the lower carbon, in combination with a main or upper lamp-frame to which the lower lamp-frame is detachably secured.

9. In an inclosed arc-lamp, a lower lamp structure provided with a gas-check and a locking device secured to the gas-check, in combination with a main or upper lamp-frame to which the lower frame can be detachably secured.

10. In an inclosing arc-lamp, a lower lamp-frame provided with a gas-check, an upper lamp-frame, and a bayonet-joint connecting the two frames.

11. In an arc-lamp, a support for the lower carbon consisting of a stirrup adapted to form the base or bottom on which the lower end of the carbon rests.

12. In an arc-lamp, a support for the lower carbon consisting of a swinging stirrup adapted to be moved into position under the lower end of the carbon.

13. In an arc-lamp, a support for the lower carbon consisting of a swinging stirrup adapted to be moved into position under the lower end of the carbon and a set-screw adapted to lock the said stirrup in place and also to bear against the lower carbon.

14. In an arc-lamp, a lower lamp-frame consisting of a bent rod of angular metal having its curved ends severed and united by clamps to the holder for the lower carbon.

15. In an arc-lamp, a lower lamp-frame consisting of bent metal having its curved ends severed and clamped together by the holder for the lower carbon.

16. In an arc-lamp, a lower lamp-frame consisting of bent metallic rod having its ends severed and clamped together by plates on opposite sides of the severed ends, the said plates constituting a portion of the holder for the lower carbon and being provided with a set-screw for holding the carbon in place.

17. In an arc-lamp, a lower lamp-frame consisting of a bent rod of angular metal severed at its bent portion, the severed ends being connected by opposite sides thereof and the plates forming the bearing for a swinging stirrup serving to support the lower end of the lower carbon.

Signed at New York, in the county of New York and State of New York, this 24th day of July, A. D. 1900.

PHILIP LUHR.

Witnesses:
WM. H. CAPEL,
GEORGE H. STOCKBRIDGE.